(12) United States Patent
Bergs et al.

(10) Patent No.: US 12,030,534 B2
(45) Date of Patent: Jul. 9, 2024

(54) METHOD AND ARRANGEMENT FOR DISTRIBUTING PASSENGERS IN A PASSENGER TRAIN

(71) Applicant: Siemens Mobility GmbH, Munich (DE)

(72) Inventors: Christoph Bergs, Munich (DE); Sylvia Glas, Munich (DE); Mohamed Khalil, Munich (DE); Stefan Boschert, Neubiberg (DE); Theodoros Papadopoulos, Munich (DE)

(73) Assignee: SIEMENS MOBILITY GMBH, Munich (DE)

( * ) Notice: Subject to any disclaimer, the term of this patent is extended or adjusted under 35 U.S.C. 154(b) by 831 days.

(21) Appl. No.: 17/026,049

(22) Filed: Sep. 18, 2020

(65) Prior Publication Data

US 2021/0086806 A1  Mar. 25, 2021

(30) Foreign Application Priority Data

Sep. 25, 2019 (EP) ................................... 19199613

(51) Int. Cl.
*B61L 15/00* (2006.01)
*G06Q 10/02* (2012.01)
*G06Q 10/04* (2023.01)

(52) U.S. Cl.
CPC .......... *B61L 15/0018* (2013.01); *G06Q 10/02* (2013.01); *G06Q 10/04* (2013.01)

(58) Field of Classification Search
CPC ............................ B61L 15/0018; G06Q 10/02
See application file for complete search history.

(56) References Cited

U.S. PATENT DOCUMENTS

2013/0161450 A1* 6/2013 Klettke .................. G06Q 10/02
244/137.2
2015/0051931 A1* 2/2015 Miller .............. G06Q 10/06311
705/7.15

(Continued)

FOREIGN PATENT DOCUMENTS

CN 102119319 A 7/2011
CN 104903176 A 9/2015

(Continued)

OTHER PUBLICATIONS

Extended European Search Report in corresponding European Patent Application No. 19199613.1 dated Mar. 27, 2020. 9 pages.

*Primary Examiner* — Jess Whittington
(74) *Attorney, Agent, or Firm* — Schmeiser, Olsen & Watts LLP

(57) ABSTRACT

For a respective passenger car, a number of passengers situated therein and/or a number of available spaces is determined. A passenger flow simulation is initialized on the basis of the determined numbers is provided. A multiplicity of potential directions of movement are furthermore determined, for which a multiplicity of direction of movement-specific movement profiles are read in. The initialized passenger flow simulation is then executed for a respective movement profile, wherein a distribution value that rates a resultant passenger distribution is determined in each case. From the potential directions of movement, depending on the determined distribution values, specific directions of movement are selected and are output as direction of movement indications on passenger-specific and/or location-specific direction indicators is also provided.

10 Claims, 3 Drawing Sheets

(56) References Cited

U.S. PATENT DOCUMENTS

| | | | |
|---|---|---|---|
| 2017/0197646 A1 | 7/2017 | Shubs, Jr. et al. | |
| 2017/0200355 A1* | 7/2017 | Gruenbaum | H04N 7/181 |
| 2019/0118838 A1 | 4/2019 | Lequio et al. | |
| 2019/0164419 A1 | 5/2019 | Kumar | |
| 2019/0279180 A1* | 9/2019 | Aich | G06Q 50/40 |
| 2021/0049724 A1* | 2/2021 | Morris | G06K 19/06037 |

FOREIGN PATENT DOCUMENTS

| | | |
|---|---|---|
| CN | 205186189 U | 4/2016 |
| CN | 107351870 A | 11/2017 |
| CN | 207389192 U | 5/2018 |
| CN | 108423036 A | 8/2018 |
| CN | 109697405 A | 4/2019 |
| DE | 102018129999 A1 | 5/2019 |
| EP | 0738060 A2 | 10/1996 |
| WO | 2010015265 A1 | 2/2010 |

* cited by examiner

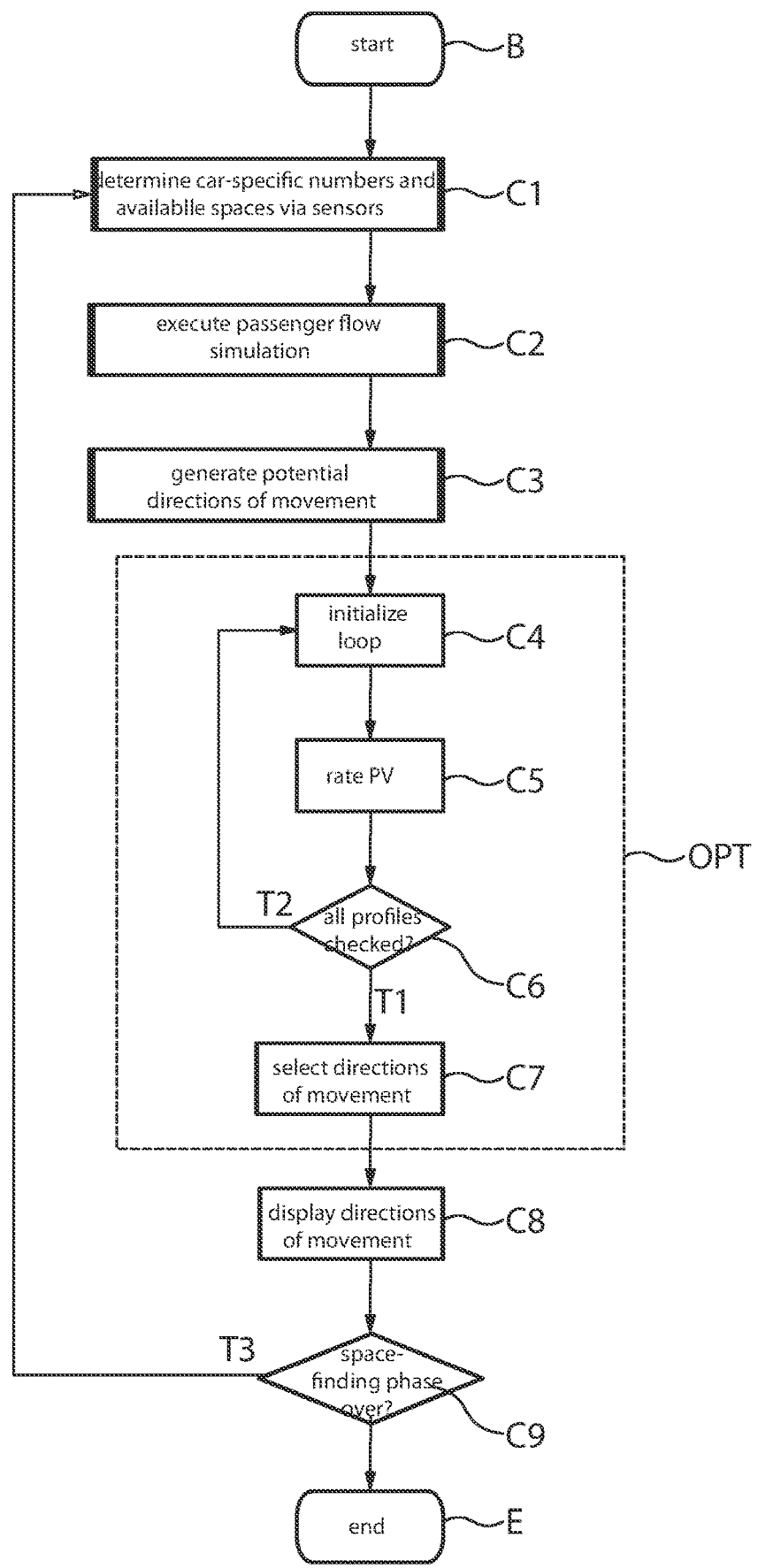

METHOD AND ARRANGEMENT FOR DISTRIBUTING PASSENGERS IN A PASSENGER TRAIN

CROSS-REFERENCE TO RELATED APPLICATIONS

This application claims priority to European Patent Application No. EP 19199613.1, having a filing date of Sep. 25, 2019, the entire contents of which are hereby incorporated by reference.

FIELD OF TECHNOLOGY

In many passenger trains, finding a seat or standing space is often difficult or inconvenient, since reservation systems often fail, a replacement train is used for the journey and/or the passenger train is overfilled. This difficulty is caused in many cases by congested corridors due to opposing directions of movement of the train passengers. This often leads to a situation whereby a passenger train is unevenly loaded, since there may be considerably more passengers in some passenger cars than in others, even though the latter are still largely unoccupied. This may lead, inter alia, to uneven wear of wearable components of the passenger train and to blocked exits. Such a situation may furthermore be perceived by passengers to be a considerable impact on comfort.

BACKGROUND

In order to distribute the train passengers more evenly across a passenger train, up until now a loudspeaker system is usually used to announce the passenger cars in which seats or standing spaces are still available. To this end, however, it is initially necessary to have an overview of the passenger distribution in the train.

SUMMARY

One aspect of the present invention is to provide a method and an arrangement for distributing passengers in a passenger train that allow more efficient passenger distribution.

Another aspect relates to a computer program produce (non-transitory computer readable storage medium having instructions, which when executed by a processor, perform actions).

In order to distribute passengers in a passenger train having a plurality of passenger cars, for a respective passenger car, a number of passengers situated therein and/or a number of available spaces is determined, in particular estimated. A respective space may in this case be a seat or a standing space, and be reserved or unreserved. A passenger flow simulation is initialized on the basis of the determined car-specific numbers of passengers and/or numbers of available spaces. A multiplicity of potential directions of movement are also determined, for which a multiplicity of direction of movement-specific movement profiles are read in. According to the embodiment of the present invention, the initialized passenger flow simulation is executed for a respective movement profile, wherein a distribution value that rates a resultant passenger distribution is determined in each case. From the potential directions of movement, depending on the determined distribution values, specific directions of movement are selected and output as direction of movement indications on passenger-specific and/or location-specific direction indicators.

In order to execute the method according to the embodiment of the present invention, an arrangement for distributing passengers in a passenger train, a computer program product and a computer-readable, non-volatile storage medium are provided.

The method according to the embodiment of the present invention, the arrangement according to the present invention and the computer program product according to the present invention may in particular be executed by way of one or more computers, one or more processors, application-specific integrated circuits (ASIC), digital signal processors (DSP) and/or what are known as field-programmable gate arrays (FPGA).

By virtue of the embodiment of the present invention, it is possible to implement an interactive passenger routing system in passenger trains that is able to optimize a distribution of the passengers and their movement routes and thus considerably improve travel comfort.

According to one advantageous embodiment of the present invention, the car-specific numbers of passengers and/or numbers of available spaces may be determined on the basis of weight sensors, pressure sensors, carbon dioxide sensors, temperature sensors, optical sensors and/or through the location-specific detection of mobile devices. Pressure sensors or weight sensors may thus be arranged in the floor of a respective passenger car and used to estimate a number of passengers under the assumption of average weights of passengers with luggage.

According to a further advantageous embodiment of the present invention, the distribution values may quantify a passenger density, opposing movement of passengers, a time until the next available space is reached, a movement time, a path to be covered by passengers, the keeping clear of exits or fire extinguishers, loading of components of the passenger train and/or a weighted combination thereof. A respective distribution value may in particular quantify a distribution quality in accordance with the above distribution criteria and movement criteria. Directions of movement that lead, according to the distribution value, to a high distribution quality may thus be selected in a targeted manner in order to perform a distribution procedure in a manner and/or to achieve a distribution state.

The direction of movement indications may be output by way of lit arrows, by way of displays, in the form of audio indications, as door indications able to be perceived from outside the passenger train and/or on passenger-specific mobile devices. The passengers are thereby able to be efficiently informed of the direction in which they are more quickly or more likely able to find an available space or a space reserved for them.

According to one advantageous development of the present invention, a first passenger with a space reservation may be located and assigned to a reserved space. The passenger flow simulation may then be initialized on the basis of the location and assignment of the first passenger. A direction of movement indication specific to the first passenger may therefore be output specifically to the first passenger. The assignment of the first passenger to the reserved space may be prompted in particular by the first passenger checking in, for example by way of a smartphone or another mobile device. In order to locate the first passenger, his mobile device may be located, for example by establishing the WLAN hotspot with which the mobile device is currently registered. A respective passenger-specific direction of movement indication may then also be output on the mobile device.

According to a further advantageous development of the present invention, a passenger group feature of a second passenger may be detected and this may be assigned to a predefined passenger group on the basis of the detected passenger group feature. A passenger group-specific direction of movement indication may then be output to the second passenger. Passenger groups may in particular be paying passengers, conductors or maintenance staff. The respective passenger groups may be different when determining the distribution values, in particular weighted in a passenger group-specific manner. Movement routes of conductors may thus for example be optimized with respect to movement routes of paying passengers.

BRIEF DESCRIPTION

Some of the embodiments will be described in detail, with reference to the following figures, wherein like designations denote like members, wherein:

FIG. 3 depicts a flowchart of a method.

DETAILED DESCRIPTION

Figure 1:
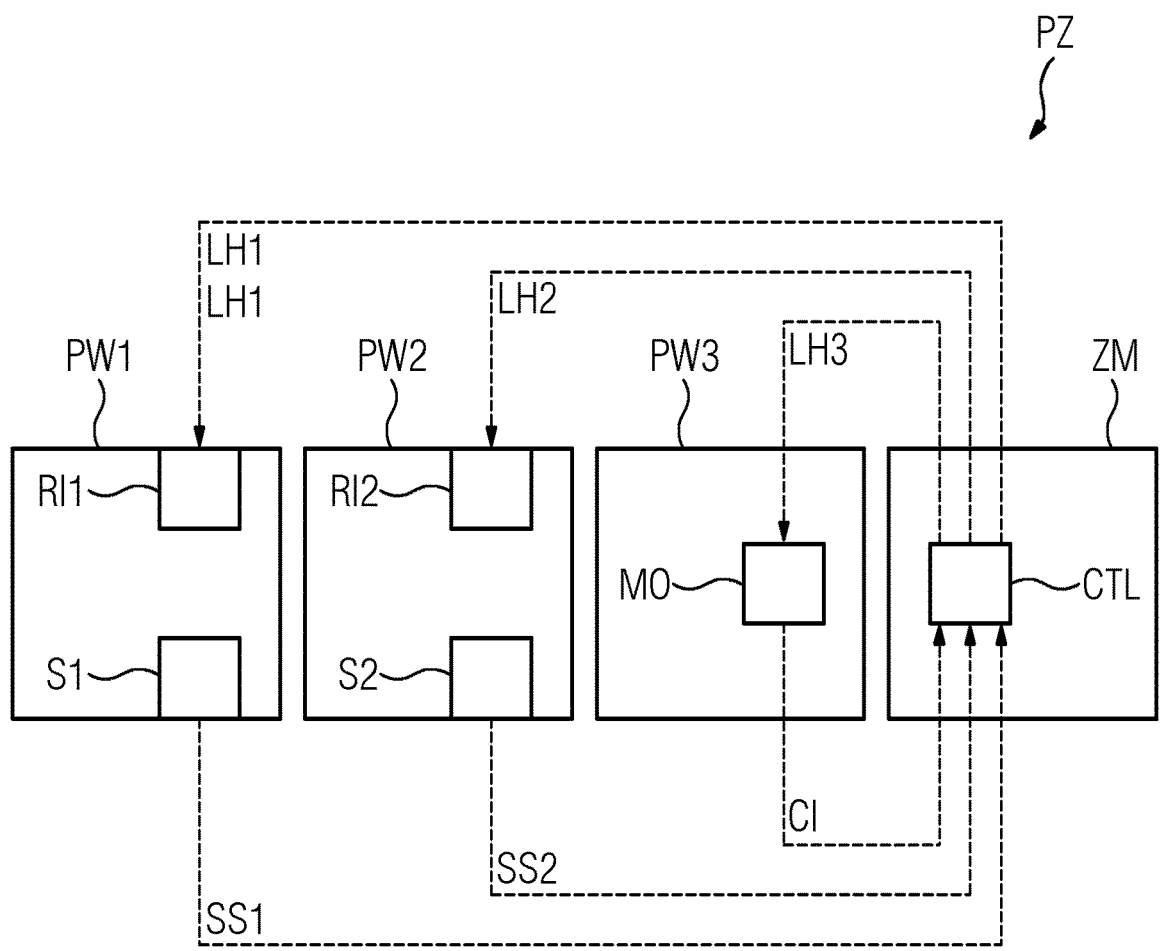
FIG. 1 depicts a passenger train with a passenger distribution arrangement.

FIG. 1 illustrates a passenger train PZ with a passenger distribution arrangement according to the embodiment of the present invention for distributing passengers across the passenger train PZ. This passenger train has a traction unit ZM and a plurality of passenger cars PW1, PW2 and PW3 that each have a multiplicity of spaces. The spaces may be seats or standing spaces, reserved spaces or unreserved spaces.

At least one car-specific and/or location-specific sensor for determining a number of passengers situated in a respective passenger car and/or a number of available spaces in a respective passenger car is situated in each of the passenger cars PW1, PW2 and PW3. It is generally sufficient to estimate the numbers of passengers or the numbers of available spaces. For the sake of clarity, FIG. 1 explicitly illustrates only sensors S1 and S2 in the passenger cars PW1 and PW2.

Weight sensors, pressure sensors, carbon dioxide sensors, temperature sensors and/or optical sensors may in particular be provided as sensors. A weight increase may thus be measured in a respective passenger car by way of pressure sensors or weight sensors installed in the floor, and a number of passengers may be estimated under the assumption of average weights of a passenger with luggage. Carbon dioxide sensors may be used to conclude as to the number of passengers from an increase in a carbon dioxide concentration in the ambient air. The passengers situated in the respective passenger car may likewise be optically detected and counted using optical sensors, such as for example cameras. The heating gradient may furthermore be detected by way of temperature sensors, in particular of heating systems or air-conditioning systems, and a number of passengers may be derived therefrom. Notifications on mobile devices connected to a respective WLAN hotspot may furthermore also be used for counting purposes. The number of available spaces in the passenger car in question may finally also be estimated from a number of passengers determined using sensors and a predefined overall number of spaces in this passenger car. Conversely, a number of passengers may be determined from a differently determined number of available spaces by way of the predefined overall number of spaces.

The respective sensor S1 or S2 continuously transmits sensor signals SS1 or SS2 from a respective passenger car PW1 or PW2 to a controller CTL of the passenger train PZ.

One or more mobile devices MO of passengers with a space reservation are furthermore illustrated by way of example in the passenger car PW3 in the present exemplary embodiment. These passengers check in for the train journey by way of their mobile devices MO and are accordingly each assigned to a reserved space. The mobile devices MO and thus the associated passengers are furthermore located in or outside the passenger train PZ, for example by establishing the WLAN hotspot with which the respective mobile device MO is registered. In the course of registering a respective mobile device MO, check-in information CI is transmitted from the respective mobile device MO to the controller CTL. The mobile devices MO thus serve as it were as passenger-specific sensors that are used, in addition to the car-specific sensors S1 and S2, to count passengers and locate passengers.

The controller CTL comprises an on-board computer and continuously detects the sensor signals SS1 and SS2 and the check-in information CI, in real time. The sensor signals SS1 and SS2 and the check-in information CI are evaluated by the controller CTL in order to continuously determine, in real time, current numbers of passengers, numbers of available spaces and location information for the passenger cars, here PW1, PW2 and PW3.

The controller CTL, according to the embodiment of the present invention, performs a multiplicity of spatially resolved passenger flow simulations on the basis of the determined numbers of passengers, numbers of available spaces and location information. The passenger flow simulations in this case simulate a movement of passengers in the passenger train PZ. As a result of the passenger flow simulations, the controller CTL determines optimized direction of movement indications LH1 or LH2 for a respective passenger car PW1 or PW2 and outputs them on a direction indicator RI1 situated in or on the passenger car PW1 or a direction indicator RI2 situated in or on the passenger car PW2. The direction indicators RI1 and RI2 are installed in or on the respective passenger car at different positions in a location-specific, in particular car-specific manner. Electronically controllable luminous signals, lit arrows, displays, loudspeakers for audio indications and/or also door indications able to be perceived outside the passenger train PZ may for example be used as direction indicators RI1 and RI2.

As a further result of the passenger flow simulations, direction of movement indications LH3 that are optimized specifically for a respective passenger registered via a mobile device MO are determined. The respective passenger-specific direction of movement indications LH3 are output on the mobile device MO of the respective passenger, which thus functions as a passenger-specific direction indicator.

Figure 2:
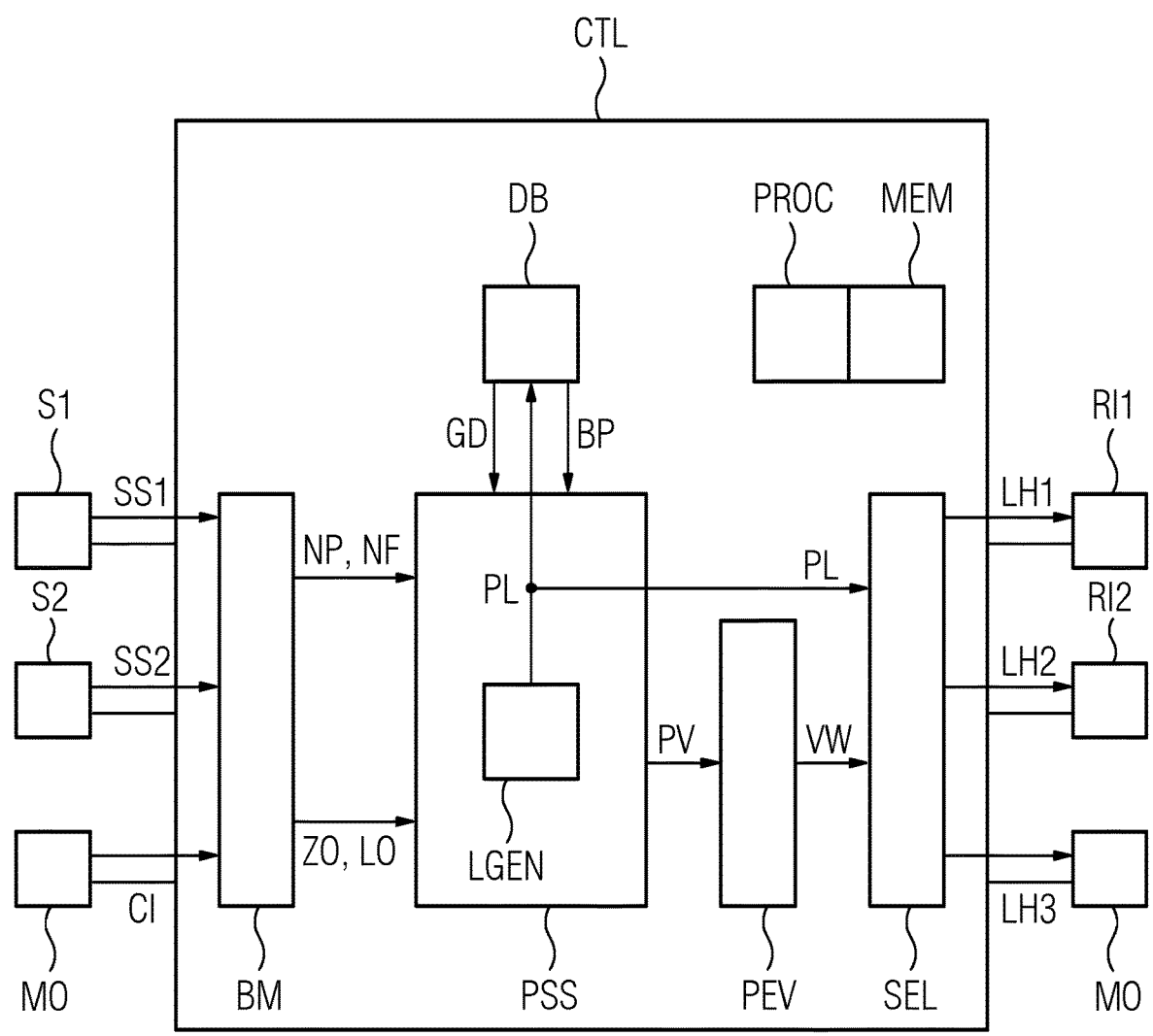
FIG. 2 depicts a detailed illustration of an arrangement.

FIG. 2 illustrates a detailed illustration of an arrangement according to the embodiment of the present invention. Where FIG. 2 uses the same or corresponding reference signs as in FIG. 1, these denote the same or corresponding entities, which are implemented or formed in the manner described above.

The arrangement according to the embodiment of the present invention comprises a controller CTL that has a processor PROC for executing method steps running thereon and a memory MEM, coupled to the processor PROC, for storing data to be processed. The controller CTL receives the sensor signals SS1 and SS2 from the sensors S1 and S2 and the check-in information CI from the mobile devices MO via which passengers have registered for the train journey.

The sensor signals SS1 and SS2 and the check-in information CI are fed to an occupancy module BM of the controller CTL. The occupancy module BM determines current car-specific numbers of passengers NP and numbers of available spaces NF from the sensor signals SS1 and SS2 and from the check-in information CI for each passenger car PW1, PW2 or PW3, as described above. The occupancy module BM furthermore assigns a reserved space to a respective passenger with a space reservation, registered via his mobile device MO, on the basis of the check-in information CI and locates this passenger, as explained in connection with FIG. 1. The respective space assignment is stored in the form of passenger-specific assignment information ZO, and the respective location is stored as passenger-specific location information LO. The assignment information ZO and the current location information LO and the current numbers of passengers NP and the current numbers of available spaces NF are transmitted by the occupancy module BM to a passenger flow simulation module PSS of the controller CTL.

The passenger flow simulation module PSS is first of all initialized on the basis of car-specific geometry data GD of the individual passenger cars PW1, PW2 and PW3. The geometry data GD are read in by the passenger flow simulation module PSS from a database DB and may comprise construction data or other data about the specific geometry of the individual passenger cars PW1, PW2 and PW3, in particular about their accessible movement areas. The passenger flow simulation module PSS is furthermore initialized on the basis of the car-specific numbers of passengers NP and numbers of available spaces NF and the passenger-specific assignment information ZO and location information LO.

A multiplicity of potential, currently possible directions of movement PL for the passengers situated in the passenger cars PW1, PW2 and PW3 are generated by a direction of movement generator LGEN of the passenger flow simulation module PSS on the basis of the supplied data GD, NP, NF, ZO and LO. The direction of movement generator LGEN in particular generates directions of movement from a fuller passenger car to an emptier passenger car, and directions of movement of passengers with a reservation to the seats they have reserved. Variations in these directions of movement are also generated. The potential directions of movement PL are generated in a location-specific, in particular goods-specific and/or passenger-specific or passenger group-specific manner. The potential directions of movement PL may also be generated in the form of a spatially resolved and/or passenger-specific direction of movement distribution.

For one or more potential directions of movement PL or spatially resolved direction of movement distributions, the passenger flow simulation module PSS reads in a respective direction of movement-specific movement profile BP from the database DB. The movement profiles BP may constitute empirical probability distributions that each specify, for predefined directions of movement, at what speed and in what direction how many passengers will typically move at what frequency. A multiplicity of libraries containing realistic movement patterns are available for such movement profiles BP.

After reading in a respective movement profile BP, the initialized passenger flow simulation module PSS executes a passenger flow simulation based on this movement profile BP, for example in the form of a particle simulation and/or of an agent-based simulation for the passengers situated in the passenger train. Such passenger flow simulations are able to be executed highly efficiently, such that they are in particular able to be implemented in real time. A multiplicity of standard methods are available for executing these simulations.

For each movement profile BP, the passenger flow simulation in each case determines a passenger distribution PV resulting therefrom and transmits it to a rating module PEV of the controller CTL. The rating module PEV rates a respective passenger distribution PV and calculates a distribution value VW specific to this passenger distribution PV. The distribution value VW rates this passenger distribution PV and quantifies in particular a distribution quality of the simulated distribution procedure and/or of the simulated distribution state of this passenger distribution PV. A passenger density, opposing movement of passengers, a time until an available space is reached, a movement time, a path to be covered by a passenger, the keeping clear of exits or fire extinguishers and/or loading of components of a passenger train may be used in particular as rating criteria. A respective distribution value VW may be calculated using what is known as a cost function for the passenger distribution PV. A cost function, which is also often referred to as reward function or loss function, is often used in the context of numerical optimization methods to calculate a parameter to be optimized. In the present exemplary embodiment, the cost function maps the above rating criteria for a respective passenger distribution PV onto the respective distribution value VW and feeds this back. The determined distribution values VW are used, according to the embodiment of the present invention, to optimize the directions of movement of the passengers in the passenger train PZ with regard to an optimization aim implemented in the cost function, in order to perform the distribution procedure in a manner and/or to achieve a distribution state.

The rating module PEV transmits the calculated distribution values VW to a selection module SEL of the controller CTL. In parallel therewith, the potential directions of movement PL are transmitted by the direction of movement generator LGEN to the selection module SEL. The selection module SEL is used to select directions of movement that are optimized with regard to the distribution values VW from the potential directions of movement PL. In this case, those directions of movements that lead to a high distribution quality in accordance with the distribution values VW are specifically selected from the potential directions of movement PL depending on the determined distribution values VW, in order to perform the distribution procedure in a manner and/or to achieve a distribution state. The selected directions of movement are location-specific, that is to say assigned to a specific position in the passenger train PZ or a specific passenger car, and/or passenger-specific, that is to say assigned to a specific passenger or his mobile device. The selected directions of movement are accordingly output as location-specific or passenger-specific direction of movement indications LH1, LH2 and LH3. In the present exemplary embodiment, a location-specific direction of movement indication LH1 is output to the direction indicator RI1, a location-specific direction of movement indication LH2 is output to the direction indicator RI2 and the passenger-specific direction of movement indications LH3 are output in each case to the specifically assigned mobile telephone MO functioning as passenger-specific direction indicator.

FIG. 3 schematically illustrates a flowchart of a method according to the embodiment of the present invention containing method steps C1 to C9. The method steps C1 to C9 are executed by the controller CTL, in real time.

Following the start B of the method, in method step C1, a current occupancy state of the passenger cars PW1, PW2 and PW3, and in particular the car-specific numbers of passengers NP and the numbers of available spaces NF, are determined by way of the sensors S1 and S2 and by way of the registered mobile devices MO. The assignment information ZO and the location information LO are furthermore ascertained.

In method step C2, passenger flow simulations to be executed by the passenger flow simulation module PSS are initialized on the basis of the geometry data GD, the numbers of passengers NP, the numbers of available spaces NF, the assignment information ZO and the location information LO.

In method step C3, the potential directions of movement PL are generated and the associated movement profiles BP are read in.

In method step C4, a loop is initialized over all of the movement profiles BP. The initialized passenger flow simulation is furthermore executed for a respective movement profile BP, and a respective resultant passenger distribution PV is determined.

In method step C5, the respective passenger distribution PV is rated and an associated distribution value VW is in each case determined.

In method step C6, it is checked whether all of the movement profiles BP have been worked through. If this is the case, a transition T1 to method step C7 is triggered, and if not there is a return T2 to method step C4 in order to execute the passenger flow simulation for the next movement profile.

In method step C7, those directions of movement in which a respective distribution value VW indicates a high distribution quality are selected from the potential directions of movement PL.

Method steps C4 to C7 implement route optimization OPT that determines an advantageous direction of movement for each position or for each registered passenger.

In method step C8, the selected directions of movement are displayed as location-specific or passenger-specific direction of movement indications LH1, LH2 or LH3 on the respectively assigned positions in the passenger train PZ, in the respectively assigned passenger cars PW1, PW2 or PW3 and/or on the mobile devices MO of the registered passengers.

In method step C9, it is checked whether a space-finding phase in the passenger train PZ has ended. To this end, it may for example be checked whether an even occupancy in the passenger cars PW1, PW2, PW3 has been achieved and/or whether passenger movements in the passenger train PZ are decreasing to a significant extent or have come to a standstill. If the space-finding phase is still continuing, a return T3 to method step C1 is executed in order to determine a current movement state again. Otherwise, the end E of the method is reached.

The method according to the embodiment of the present invention is executed during the boarding and disembarkation of passengers and during the distribution of the passengers across the passenger cars PW1, PW2 and PW3 or across the available spaces in the passenger train PZ. By virtue of the passenger flow simulation that accompanies operation, it is possible to implement an interactive passenger routing system in the passenger train PZ that improves and speeds up the distribution of the passengers and thus considerably increases travel comfort.

What is claimed:

1. A method for distributing passengers in a passenger train having a plurality of passenger cars on a basis of direction of movement indications, the method comprising:

determining, by a controller of the passenger train, for a respective passenger car, a number of passengers situated therein and/or a number of available spaces, by continuously detecting sensor signals from one or more sensors and check-in information transmitted by passenger mobile devices;

initializing, by the controller, a passenger flow simulation on a basis of the determined passenger car-specific numbers of passengers, the numbers of available spaces, and passenger car-specific geometry of the respective passenger car in order to simulate a movement of passengers in the passenger train, in real-time;

determining, by the controller, a multiplicity of potential directions of movement, for which a multiplicity of direction of movement-specific movement profiles are read in, each respective movement profile being empirical probability distributions that specify a speed, a direction, and a quantity of passengers that will typically move at a frequency within the respective passenger car;

executing, by the controller, the initialized passenger flow simulation for the respective movement profile, wherein the passenger flow simulation determines a passenger distribution for each passenger;

calculating, by the controller, using a numerical optimization method, distribution values specific the passenger distribution;

selecting, by the controller, from the multiplicity of potential directions of movement and depending on the distribution values, specific directions of movement; and outputting, by the controller, the selected directions of movement as direction of movement indications on passenger-specific and/or location-specific direction indicators.

2. The method as claimed in claim 1, wherein the car-specific numbers of passengers and/or numbers of available spaces are determined on a basis of weight sensors, pressure sensors, carbon dioxide sensors, temperature sensors, optical sensors and/or through the location-specific detection of mobile devices.

3. The method as claimed in claim 1, wherein the passenger distribution represents a passenger density, opposing movement of passengers, a time until an available space is reached, a movement time, a path to be covered by passengers, the keeping clear of exits or fire extinguishers, loading of components of the passenger train and/or a weighted combination thereof, as rating criteria that is used in the numerical optimization method to calculate the distribution values.

4. The method as claimed in claim 1, wherein the passenger flow simulation is executed by way of a particle simulation and/or an agent-based simulation.

5. The method as claimed in claim 1, wherein the direction of movement indications are output by way of lit arrows, by way of displays, as audio indications, as door indications able to be perceived outside the passenger train and/or on passenger-specific mobile devices.

6. The method as claimed in claim 1, wherein a first passenger with a space reservation is located and assigned to a reserved space, in that the passenger flow simulation is initialized on the basis of a location and an assignment of the first passenger, and in that a direction of movement indication specific to the first passenger is output specifically to the first passenger.

7. The method as claimed in claim 1, wherein a passenger group feature of a second passenger is detected, in that the second passenger is assigned to a predefined passenger group on a basis of the detected passenger group feature, and in that a passenger group-specific direction of movement indication is output to the second passenger.

8. The method as claimed in claim 7, wherein the passenger group-specific weighting is performed when determining the distribution values.

9. A system for distributing passengers in a passenger train having a plurality of passenger cars on a basis of direction of movement indications, the system comprising:
   a controller of a passenger train, the controller comprising a processor and a memory coupled to the processor, configured to:
      determine, for a respective passenger car, a number of passengers situated therein and/or a number of available spaces, by continuously detecting sensor signals from one or more sensors and check-in information transmitted by passenger mobile devices;
      initialize a passenger flow simulation on a basis of the determined passenger car-specific numbers of passengers, the numbers of available spaces, and passenger car-specific geometry of the respective passenger car in order to simulate a movement of passengers in the passenger train, in real-time;
      determine a multiplicity of potential directions of movement, for which a multiplicity of direction of movement-specific movement profiles are read in, each respective movement profile being empirical probability distributions that specify a speed, a direction, and a quantity of passengers that will typically move at a frequency within the respective passenger car;
      execute the initialized passenger flow simulation for the respective movement profile, wherein the passenger flow simulation determines a passenger distribution for each passenger;
      calculate, using a numerical optimization method, distribution values specific the passenger distribution;
      select from the multiplicity of potential directions of movement and depending on the distribution values, specific directions of movement; and
      output the selected directions of movement as direction of movement indications on passenger-specific and/or location-specific direction indicators.

10. A computer program product, comprising a computer readable hardware storage device having computer readable program code stored therein, said program code executable by a processor of a computer system to implement a method comprising:
   determining, by a controller of the passenger train, for a respective passenger car, a number of passengers situated therein and/or a number of available spaces, by continuously detecting sensor signals from one or more sensors and check-in information transmitted by passenger mobile devices;
   initializing, by the controller, a passenger flow simulation on a basis of the determined passenger car-specific numbers of passengers, the numbers of available spaces, and passenger car-specific geometry of the respective passenger car in order to simulate a movement of passengers in the passenger train, in real-time;
   determining, by the controller, a multiplicity of potential directions of movement, for which a multiplicity of direction of movement-specific movement profiles are read in, each respective movement profile being empirical probability distributions that specify a speed, a direction, and a quantity of passengers that will typically move at a frequency within the respective passenger car;
   executing, by the controller, the initialized passenger flow simulation for the respective movement profile, wherein the passenger flow simulation determines a passenger distribution for each passenger;
   calculating, by the controller, using a numerical optimization method, distribution values specific the passenger distribution;
   selecting, by the controller, from the multiplicity of potential directions of movement and depending on the distribution values, specific directions of movement; and
outputting, by the controller, the selected directions of movement as direction of movement indications on passenger-specific and/or location-specific direction indicators.

* * * * *